United States Patent
Sugihara

(10) Patent No.: US 7,277,086 B2
(45) Date of Patent: Oct. 2, 2007

(54) INFORMATION PROCESSING APPARATUS

(75) Inventor: Hirotoshi Sugihara, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 723 days.

(21) Appl. No.: 10/765,185

(22) Filed: Jan. 28, 2004

(65) Prior Publication Data

US 2004/0227730 A1 Nov. 18, 2004

(30) Foreign Application Priority Data

Apr. 10, 2003 (JP) .............................. 2003-106422

(51) Int. Cl.
*G09G 5/00* (2006.01)
*H05K 5/00* (2006.01)

(52) U.S. Cl. ...................... 345/169; 345/156; 345/901; 361/681; 455/575.1; 455/575.3; 713/300; 335/205

(58) Field of Classification Search ........ 345/156–169, 345/901, 905, 173–183; 178/18.02–18.07, 178/19.01–19.04; 455/556.2, 566, 550.1, 455/575.1, 575.3; 379/433.04; 335/205–207; 713/300, 320, 324, 340
See application file for complete search history.

(56) References Cited

U.S. PATENT DOCUMENTS

| | | | | |
|---|---|---|---|---|
| 5,896,575 A | * | 4/1999 | Higginbotham et al. | .... 455/566 |
| 6,060,969 A | * | 5/2000 | Hufgard et al. | ............. 335/207 |
| 6,314,183 B1 | * | 11/2001 | Pehrsson et al. | ....... 379/433.06 |
| 6,445,574 B1 | * | 9/2002 | Saw et al. | ................... 361/681 |
| 6,466,202 B1 | * | 10/2002 | Suso et al. | ................... 345/169 |
| 6,492,974 B1 | * | 12/2002 | Nobuchi et al. | ............ 345/156 |
| 6,549,789 B1 | * | 4/2003 | Kfoury | .................... 455/550.1 |
| 6,622,012 B2 | * | 9/2003 | Bilotti et al. | ............ 455/575.3 |
| 6,813,146 B2 | * | 11/2004 | Haraguchi et al. | .......... 361/681 |
| 6,839,101 B2 | * | 1/2005 | Shima | ......................... 349/58 |
| 7,074,045 B2 | * | 7/2006 | Kawahigashi et al. | ........ 439/38 |
| 2002/0009192 A1 | * | 1/2002 | Nakamura | ............. 379/433.01 |
| 2002/0119802 A1 | * | 8/2002 | Hijii | ........................... 455/550 |
| 2005/0136970 A1 | * | 6/2005 | Kim | ....................... 455/550.1 |

FOREIGN PATENT DOCUMENTS

| | | |
|---|---|---|
| JP | 8-179851 | 7/1996 |
| JP | 08179851 | * 7/1996 |

* cited by examiner

*Primary Examiner*—Lun-Yi Lao
(74) *Attorney, Agent, or Firm*—Wenderoth, Lind & Ponack, L.L.P.

(57) ABSTRACT

The invention presents an information processing apparatus having a simple structure and which is capable of distinguishing between states of use, automatically changing over the display direction of the display screen, and excellent in shock durability, protection from water drops and dust, as well as power savings. The information processing apparatus includes a main body having a first contact-free sensor element, a display unit having a display panel and a second contact-free sensor element, a hinge having axes of rotation for coupling the main body and the display unit, and a display processor for rotating the display of the display panel. At least either the first contact-free sensor element or the second contact-free sensor element sends a first signal to the display processor when the first contact-free sensor element and the second contact-free sensor element are placed face to face, and the display processor rotates the display of the display panel according to the first signal.

11 Claims, 7 Drawing Sheets

INFORMATION PROCESSING APPARATUS

FIELD OF THE INVENTION

The present invention relates to an information processing apparatus, and more particularly to an information processing apparatus having a foldable display unit, with the display panel serving also as an input tablet.

BACKGROUND OF THE INVENTION

Among personal computers as information processing apparatus, recently, so-called notebook-sized personal computers are widely used. Notebook-sized personal computers are small and portable, and occupy a small space on a desk, and various professional types are manufactured.

FIG. 5 is a perspective view of a conventional notebook-sized personal computer having a display panel serving also as an input tablet, and allowing both keyboard input and tablet input. FIG. 6A and FIG. 6B are side views showing two closed states of a display unit in the conventional notebook-sized personal computer. FIG. 7 is a perspective view for explaining a method of use of a tablet of the conventional notebook-sized personal computer.

In FIG. 5, this notebook-sized personal computer comprises a main body 101 and a display unit 102, which are coupled through a hinge 105. The display unit 102 has a display panel 103 and a button 121, and the display panel 103 is protected by a back cover 104. The display panel 103 is also a tablet for pen input. The hinge 105 has axes of rotation in two mutually orthogonal directions. A first axis of rotation is an opening and closing axis of the main body 101 and display unit 102. This opening and closing direction is indicated by arrow 105a. The display unit 102 is thus opened and closed, and has a free end 102a and a fixed end 102b. A second axis of rotation is a rotating axis defining a rotating direction of the display unit 102. This rotating direction is indicated by arrow 105b.

FIG. 6A is a side view of a personal computer in a finished state after closing the display unit 102 from the state in FIG. 5. FIG. 6B is a side view of a personal computer in a closed state of the display unit 102 after rotating the display unit 102 in FIG. 5 by 180° in the direction of arrow 105b. A carrying strap 108 is attached to the main body 101. In FIG. 6A and FIG. 6B, the same reference numerals as in FIG. 5 refer to the same parts as in FIG. 5, and their explanation is omitted.

When a personal computer is used in an office, usually, the personal computer is put on a desk, and the keyboard 106 is operated by both hands as shown in FIG. 5. After work, as shown in FIG. 6A, the display panel 103 is folded inside, and it is portable in this state.

When a personal computer is used outdoors, the display panel 103 is opened upward as shown in FIG. 6B and a pen input device 107 is manipulated. FIG. 7 is a perspective view showing a holding method of the personal computer in the case of pen input in outdoor use. The personal computer is held by one hand by passing fingertips through the strap 108, and the pen input device 107 detached from the main body 101 is held by the other hand, and pen input is made in a specified region of the display panel 103 functioning as a tablet. In FIG. 7, the same reference numerals as in FIG. 5 refer to the same parts as in FIG. 5, and their explanation is omitted.

In the personal computer having such structure, in this state, the display shown in the display panel 103 is inverted upside down between the keyboard input as shown in FIG. 5 and the pen input as shown in FIG. 7. Accordingly, the display direction must be changed over. That is, in FIG. 5, the upper side of the screen must be located near the free end 102a. And in FIG. 7, the lower side (front side) of the screen must be near the free end 102a. The button 121 is provided for rotating the display panel by 180°, and by manipulating this button 121, the display direction of the display panel 103 can be changed over manually.

Although it is not of the pen input type, Japanese Laid-open Patent No. H8-179851 discloses an apparatus having an exposed protrusion and a switch for changing over the display direction of the screen automatically.

Common problems of the portable personal computers are portability and power saving. In addition, portable personal computers for professional use are required to have a higher toughness than the personal computers used indoors. The personal computer shown in FIG. 5 is also used for professional purposes. Therefore, during use as shown in FIG. 7, it is required to have shock durability to withstand dropping of the personal computer main body by mistake or hitting against any hard object, shaking durability to withstand shaking during carrying, and resistance to rain and water drops, dust and others during outdoor use.

Therefore, as in the prior art, if the button, protrusion or switch for changing over the display direction is provided on the outer side, the shock durability, or protection from water drops or dust cannot be satisfied.

SUMMARY OF THE INVENTION

The information processing apparatus of the invention comprises:

a main body having first contact-free sensor element;

a display unit having a display panel and second contact-free sensor element;

a hinge having axes of rotation in two directions for coupling the main body and the display unit; and a display processor for rotating the display of the display panel, wherein at least either the first contact-free sensor element or the second contact-free sensor element sends a first signal to the display processor when the first contact-free sensor element and the second contact-free sensor element are placed face to face; and wherein the display processor rotates the display of the display panel according to the first signal.

Detailed Description of the Exemplary Embodiments

It is hence an object of the invention to solve the problems of the prior art, and present a portable information terminal of a simple structure capable of distinguishing keyboard input operation and pen input operation, and changing over the display direction of display panel automatically. The invention also presents a portable information terminal excellent in shock durability, protection from water drops and dust, and saving of energy.

Exemplary embodiments of the invention are described below while referring to the accompanying drawings.

Exemplary embodiment 1

Figure 1:
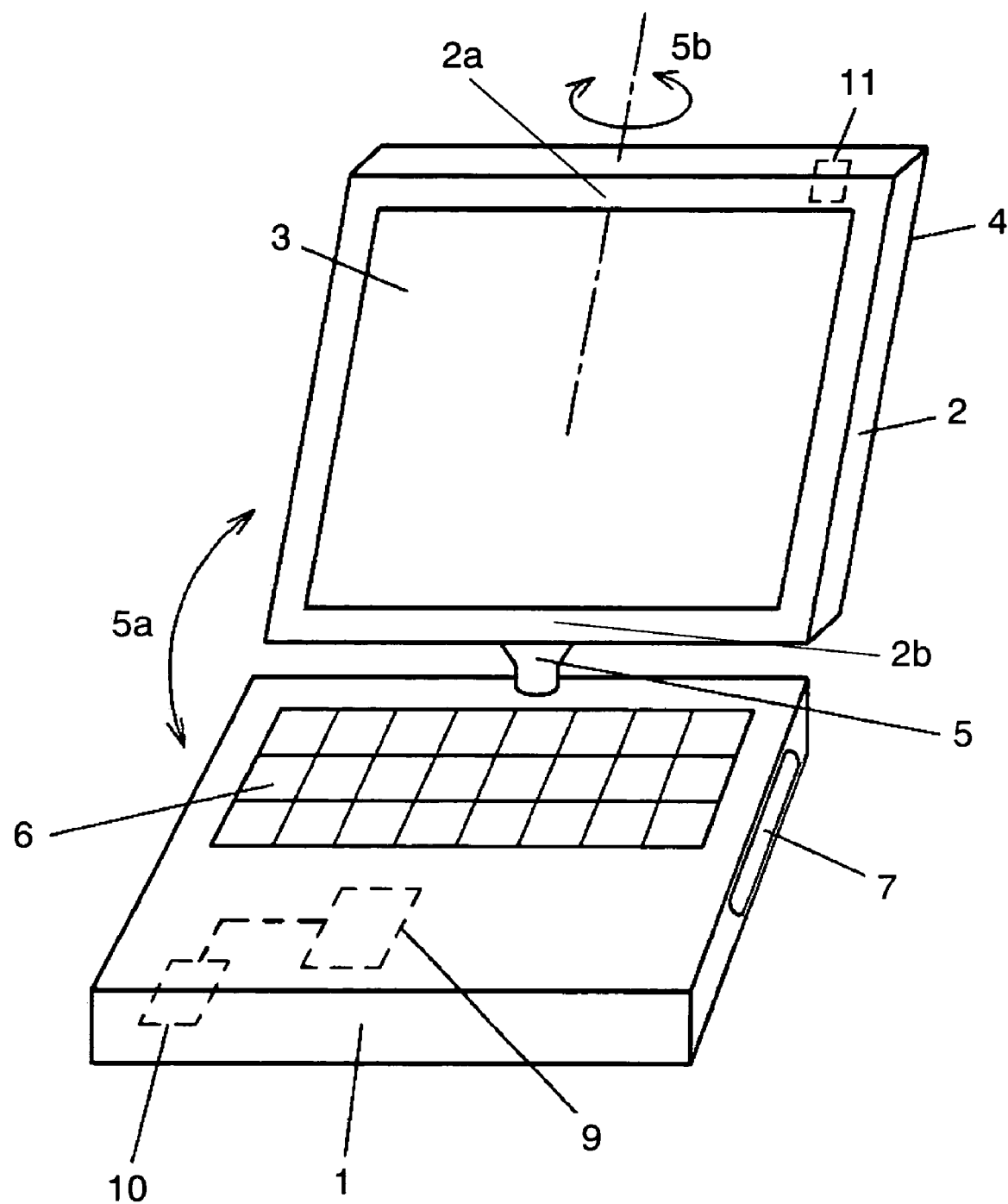
FIG. 1 is a perspective view of a notebook-sized personal computer in an exemplary embodiment of the invention.
Figure 2A:
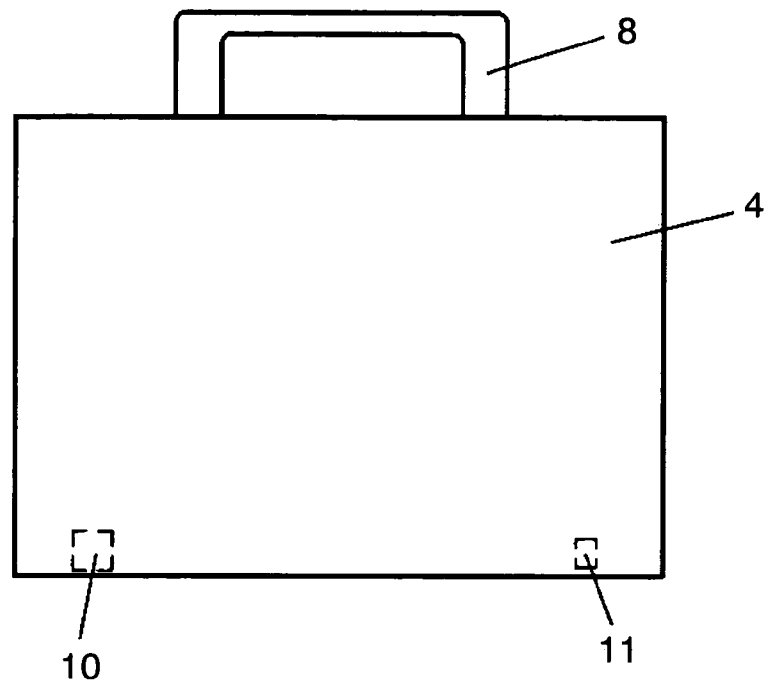
FIG. 2A is a plan view of the notebook-sized personal computer in the exemplary embodiment of the invention with a display unit thereof in one folded state.
Figure 2B:
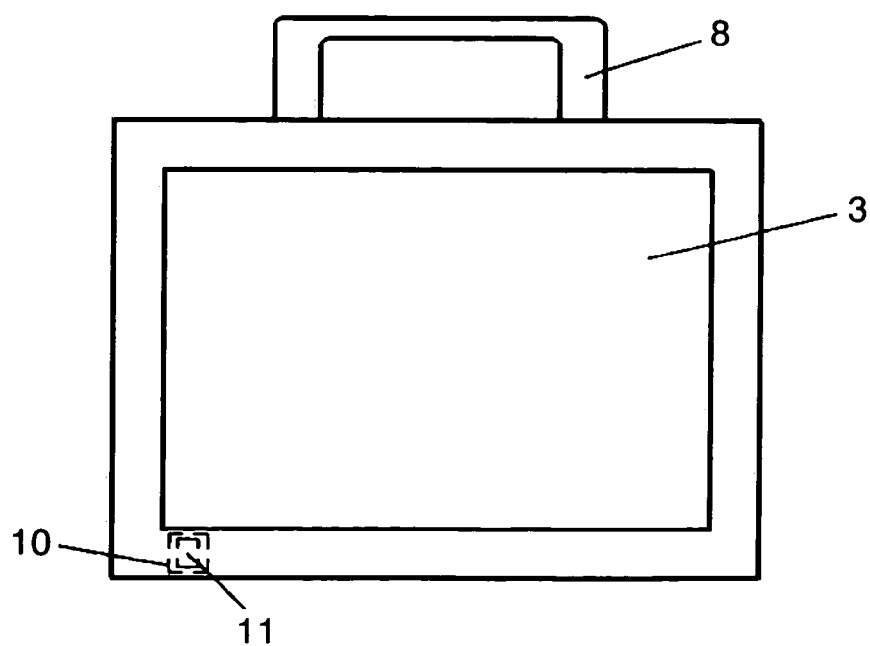
FIG. 2B is a plan view of the notebook-sized personal computer in the exemplary embodiment of the invention with the display unit in another folded state.

FIG. 1 is a perspective view of a dual-input type notebook-sized personal computer for keyboard input and tablet input in exemplary embodiment 1 of the invention. FIG. 2A and FIG. 2B are plan views showing folded states of a display unit of the notebook-sized personal computer in exemplary embodiment 1 of the invention.

In FIG. 1, this notebook-sized personal computer comprises a main body 1 and a display unit 2, which are coupled through a hinge 5. The main body 1 includes a keyboard 6, a pen input device 7, a display processor 9, a magnetic sensor 10 as a first contact-free sensor element, various storage devices, various input and output units, and information processing circuits. The display unit 2 has a display panel 3 and a magnet 11 as a second contact-free sensor element, and the display panel 3 is protected by a back cover 4. The display panel 3 is also a tablet for pen input. The hinge 5 has axes of rotation in two mutually orthogonal directions. A first axis of rotation is an opening and closing axis of the main body 1 and display unit 2. This opening and closing direction is indicated by arrow 5a. The display unit 2 is thus opened and closed, and has a free end 2a and a fixed end 2b. Magnet 11 is installed at the side of free end 2a. A second axis of rotation is a rotating axis of the display unit 2 and defines a rotating direction of the display unit. This rotating direction is indicated by arrow 5b. As mentioned, the magnetic sensor 10 is an example of a first contact-free sensor element, and the magnet 11 is an example of a second contact-free sensor element.

When the magnetic sensor 10 and the magnet 11 are placed face to face, the magnetic sensor 10 generates a first signal that is input to the display processor 9. Receiving this first signal, the display processor 9 rotates the display direction of the display panel 3 by 180°.

FIG. 2A shows a closed state of the note book-sized personal computer after the display unit 3 has been moved to one closed position by rotating the hinge 5 in FIG. 1 in the direction of arrow 5a. FIG. 2B shows another closed state of the notebook-sized personal computer after rotating the display unit 3 in FIG. 1 by 180° in the direction of arrow 5b and then rotating the display unit 3 in the direction of arrow 5a. In FIG. 2A and FIG. 2B, the same reference numerals as in FIG. 1 refer to the same parts as in FIG. 1, and their explanation is omitted.

In the state of FIG. 2B, the magnetic sensor 10 is located immediately beneath the magnet 11. The magnetic sensor 10 detects the magnetic field of the magnet 11 penetrating the casing cover, and sends a first signal to the display processor 13 for rotating the display of the display panel by 180°. As a result, in the state of FIG. 2B, when making a tablet input (pen input) by holding the main body 1 by one hand by passing the fingertips through a strap 8 of the main body 1, the screen displays in a normal direction for tablet input operation.

In FIG. 2A, the magnetic sensor 10 and magnet 11 are apart from each other, and the magnetic field of the magnet 11 does not reach up to the magnetic sensor 10. Accordingly, the display panel 3 shows a screen (i.e. display) in a normal direction for keyboard input operation. Similarly in FIG. 1, since the magnetic sensor 10 and magnet 11 are apart from each other, the display panel 3 shows a screen in a normal direction for keyboard input operation. From the state in FIG. 1 showing the screen in a normal direction for keyboard input operation, when the display unit 2 is rotated by 180° in the direction of arrow 5b by the hinge 5, the back cover 4 comes to the front. In this state, when the display unit 2 is closed in the direction of arrow 5a, the magnetic sensor 10 and magnet 11 come closer to each other gradually, and the magnetic sensor 10 detects the magnetic field of the magnet 11. By selecting the sensitivity of the magnetic sensor 10 and intensity of magnetic force of the magnet 11, the display direction of the display of the display panel 3 can be changed by 180° at a predetermined bending angle.

Accordingly, in the configuration of exemplary embodiment 1, the magnetic sensor 10 and magnet 11 can be accommodated inside of the casing of the main body 1 and display unit 2. As a result, the precision electrical parts in the personal computer can be enclosed within the casing to them from the atmosphere, and the computer is excellent in protection from water drops and dust and in portability.

Thus, depending on the state of use of the personal computer, an appropriate screen can be displayed automatically. That is, in the case of pen input (tablet input), the screen in normal direction is rotated by 180° from its normal direction by the signal from the contact-free sensor and, in other cases, the screen is displayed in its normal direction.

Further, there is an ample tolerance for the two contact-free sensor elements themselves and the mechanical dimensional precision between them, and the shock durability can be enhanced and the reliability is also improved. Besides, when the display processor is disposed at the main body side, it is more advantageous because the wiring of the sensor and display processor is easier.

The casing material of the main body 1 and display unit 2 can be any material except for magnetic material such as iron plate, and various plastics, magnesium alloy and others having no magnetic shielding property can be used.

The combination of the first contact-free sensor element and the second contact-free sensor element is constituted by the magnetic sensor and the magnet in exemplary embodiment 1, but it can be also realized by a photo sensor and a light source, a microphone and a sound source, a simple transmitter and receiver, etc. In short, the first contact-free sensor element and second contact-free sensor element are not limited to those that generate magnetism or detect magnetism. Therefore, they may include those that handle electrical waves and sonic waves (including ultrasonic waves), or that handle an electrical field and light (including ultraviolet rays and infrared rays). In these cases, too, when accommodated in the casing, the casing must be made of any material having no problem of shielding of light, sound, electrical waves, or electrical fields.

Of the first contact-free sensor element and the second contact-free sensor element, either one is an element for detecting without making contact, and the other one is an element for generating any signal to be detected without making contact (a generating source).

In exemplary embodiment 1, since the display processor 9 is incorporated in the main body 1, the magnetic sensor 10 is disposed at the main body side, but if the display processor 9 is incorporated in the display unit 2, the magnetic sensor 10 may be disposed in the display unit 2 and the magnet 11 at the main body 1 side, so that the wiring distribution is more advantageous.

Exemplary embodiment 2

Figure 3:
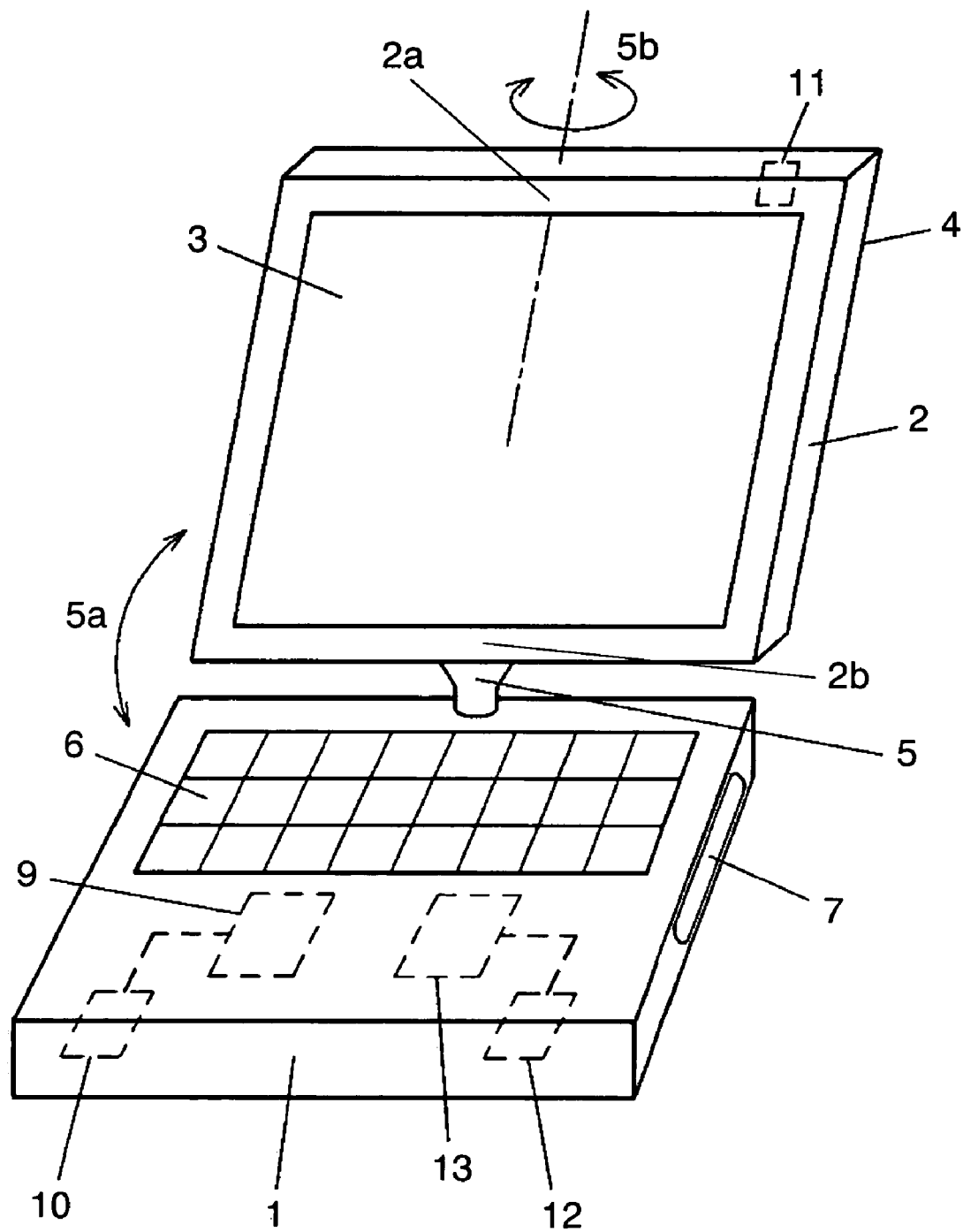
FIG. 3 is a perspective view of a notebook-sized personal computer in another exemplary embodiment of the invention.
Figure 4A:
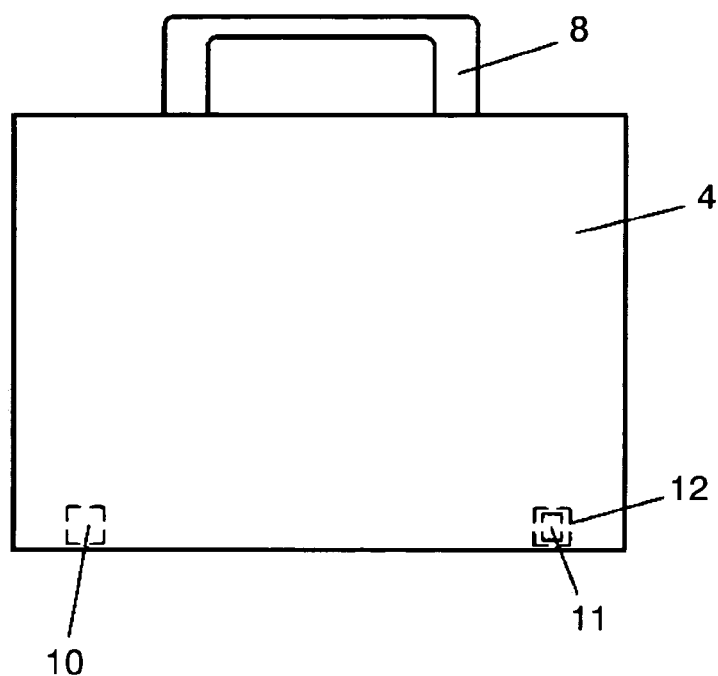
FIG. 4A is a plan view of folded state of the display unit of the notebook-sized personal computer in the other exemplary embodiment of the invention.
Figure 4B:
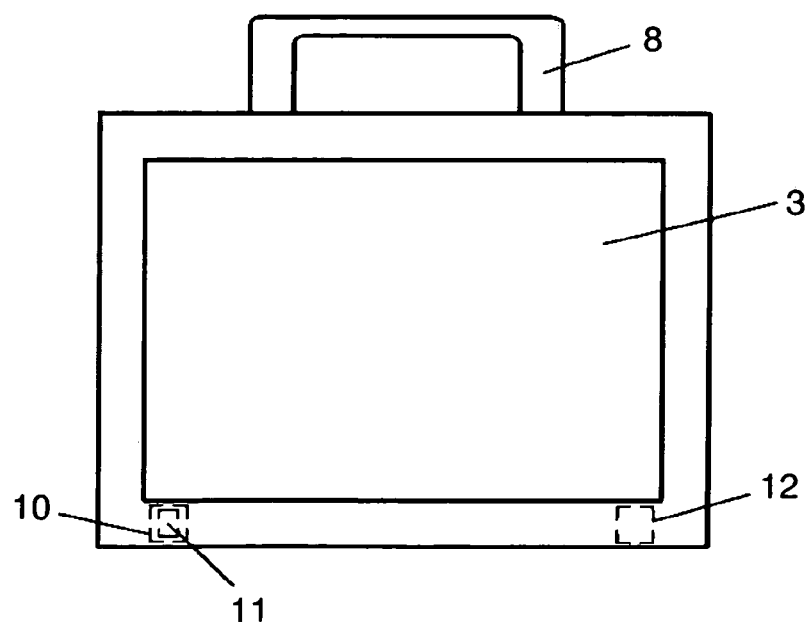
FIG. 4B is a plan view of another folded state of the display unit of the notebook-sized personal computer in the other exemplary embodiment of the invention.
Figure 5:
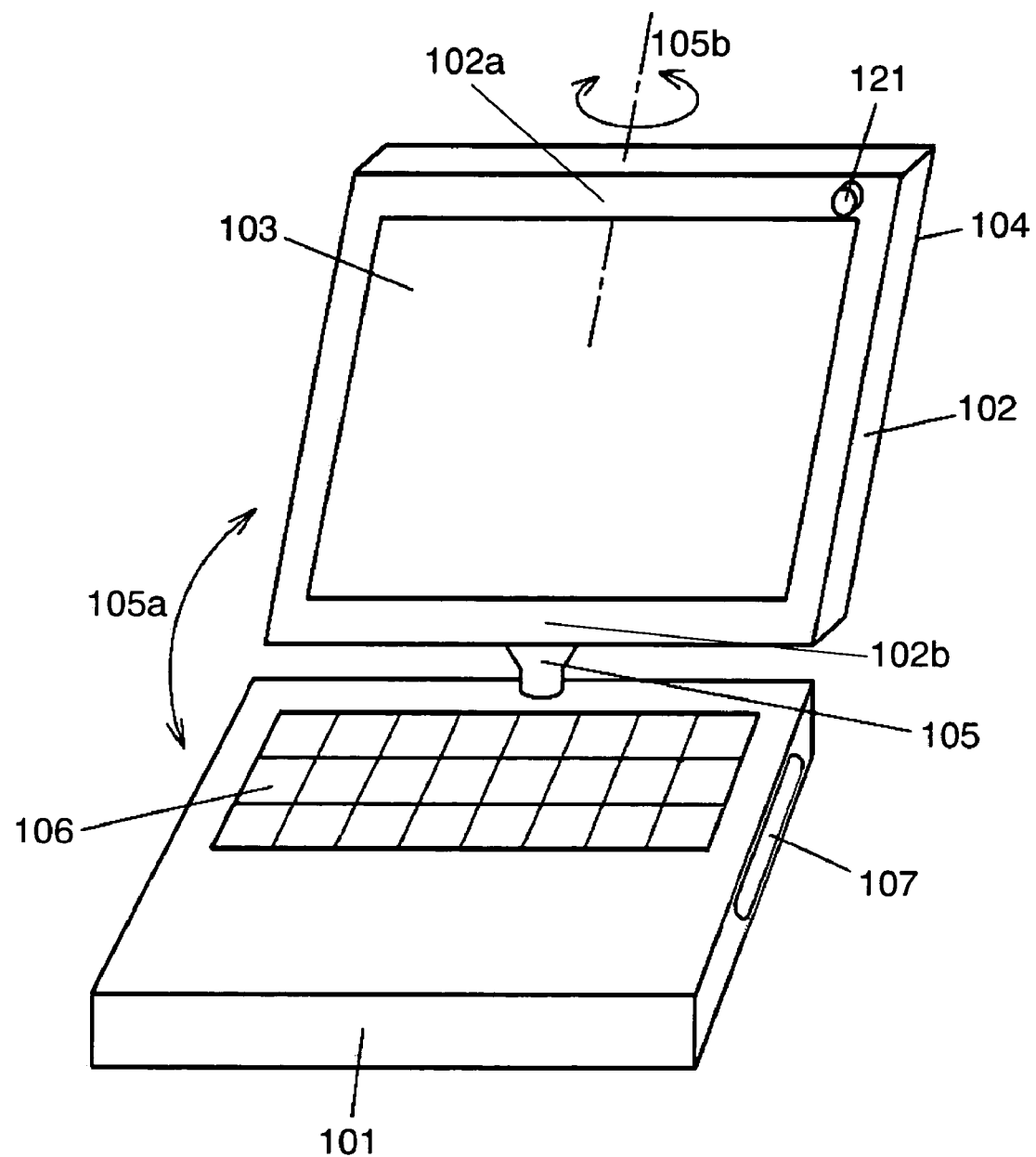
FIG. 5 is a perspective view of a prior art notebook-sized personal computer.
Figure 6A:
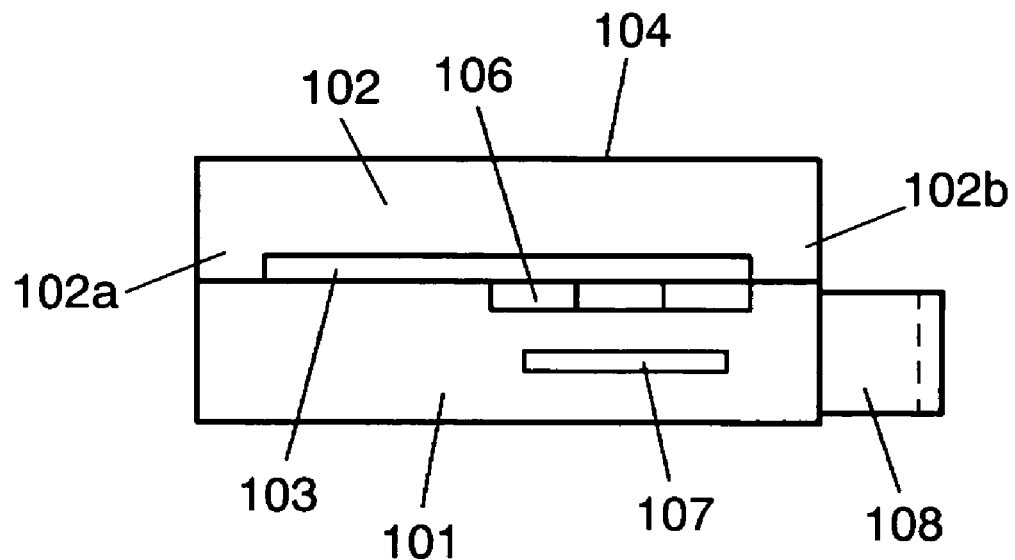
FIG. 6A is a side view of the prior art notebook-sized personal computer shown with its display unit in a closed condition.
Figure 6B:
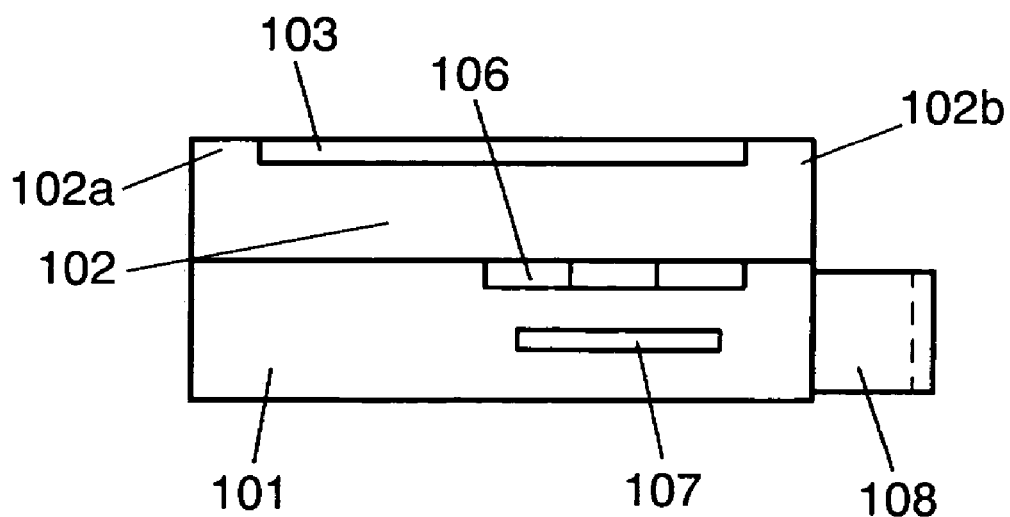
FIG. 6B is a side view of the prior art notebook-sized personal computer shown with the display unit in another closed condition.
Figure 7:
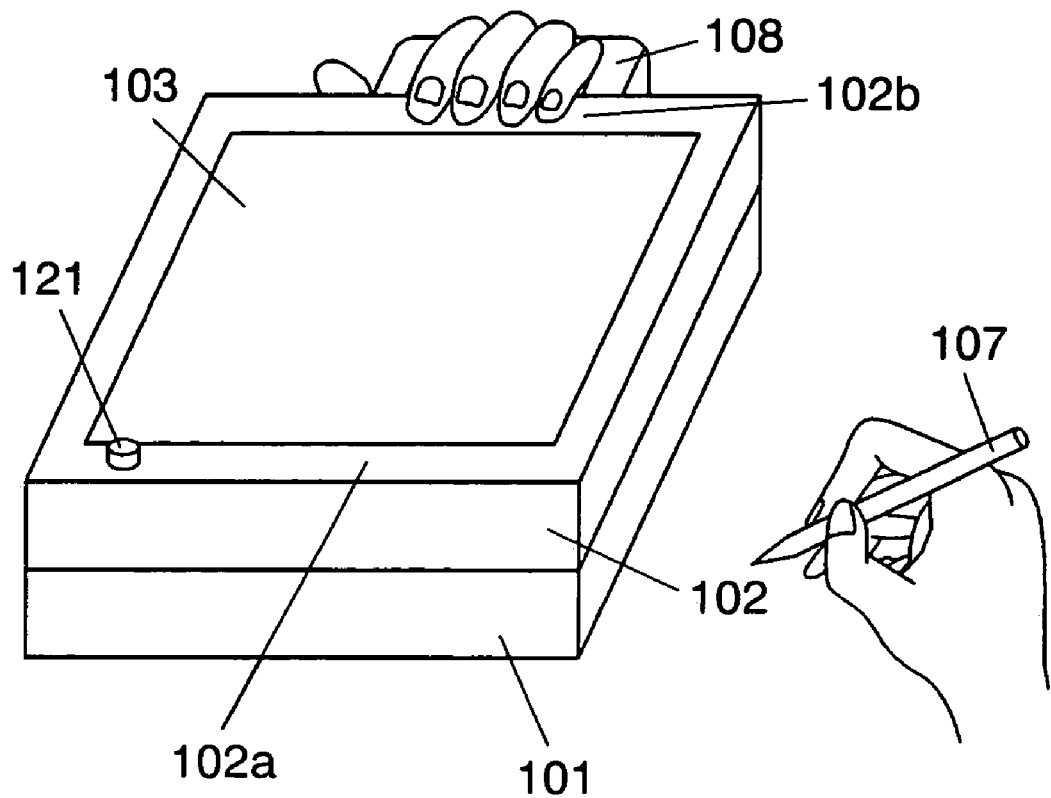
FIG. 7 is a perspective view for explaining a method of use of a tablet of the prior art notebook-sized personal computer.

FIG. 3 is a perspective view of a notebook-sized personal computer in exemplary embodiment 2 of the invention. FIG. 4A is a plan view of one folded state of a display unit of the notebook-sized personal computer in exemplary embodiment 2 of the invention. FIG. 4B is a plan view of another folded state of the display unit of the notebook-sized personal computer in exemplary embodiment 2 of the invention. In FIG. 3, FIG. 4A and FIG. 4B, the same reference numerals refer to the same parts as in FIG. 1, FIG. 2A and FIG. 2B in exemplary embodiment 1, and their explanation is omitted.

What differs between FIG. 3 and FIG. 1 is that exemplary embodiment 2 further incorporates a magnetic sensor 12 as a third contact-free sensor element and a power saver 13 provided in the main body 1, in addition to the structure of exemplary embodiment 1. That is, one more magnetic sensor 12 is provided as the third contact-free sensor element at a position symmetrical to the magnetic sensor 10 serving as the first contact-free sensor element. When the display unit 2 is closed, the magnet 11 serving as the second contact-free sensor element is designed to face either the magnetic sensor 10 or the magnetic sensor 12. The magnetic sensor 12 is an example of the third contact-free sensor element.

The magnetic sensor 10, as in exemplary embodiment 1, sends a first signal to the display processor 9 when facing the magnet 11. Receiving the first signal, the display processor 9 rotates the display direction of the display panel 3 by 180°. On the other hand, the magnetic sensor 12 is identical with the magnetic sensor 10 in structure, and when facing the magnet 11, it sends a second signal to the power saver 13. Receiving the second signal, the power saver 13 cuts off the power source of the display panel 3.

FIG. 4A and FIG. 4B are plan views showing the positional relation of the magnetic sensor 10, magnetic sensor 12 and magnet 11 when the display unit 2 is folded. The personal computer as shown in FIG. 4A has been folded by rotating the display unit 2 in FIG. 3 in the direction of arrow 5a. In FIG. 4B, the display unit 2 as shown in FIG. 3 has been rotated by 180° in the direction of arrow 5b, and then turned and folded in the direction of arrow 5a. In FIG. 4A and FIG. 4B, the same reference numerals as in FIG. 3 refer to the same parts as in FIG. 3, and their explanation is omitted.

FIG. 4B shows the of the personal computer use in a tablet state, in which the magnetic sensor 10 faces the magnet 11 the same as in exemplary embodiment 1. Therefore, the magnetic sensor 10 sends a first signal to the display processor 9, and the display of the display panel 3 is rotated by 180°.

In FIG. 4A, either the work is temporarily suspended and only the display unit 2 is closed without turning off the main power source of the personal computer, or the work is finished and the display unit 2 is closed after turning off the main power source of the personal computer. In either case, the magnetic sensor 12 faces the magnet 11. In the former case, since the display panel 3 is not used, the magnetic sensor 12 sends a second signal to the power saver 13, and the power source of the display panel 3 is cut off. In the latter case, since the main power source has been already cut off, the power saver 13 does not operate.

In the former case, by adjusting the sensitivity of the magnetic sensor 12 and the intensity of the magnetic field of the magnet 11, even when the display unit 2 is half open, the power saver 13 can operate.

In this exemplary embodiment, the magnet 11 is required to radiate the magnetic field to the outside, through the display panel 3 side and the back cover 4 side. Hence, it is desired to place the magnet 11 in the middle in the thickness direction of the display unit 2.

In the explanation above, as the third contact-free sensor element, the magnetic sensor 12 is used. The third contact-free sensor element of the invention is, as with the first contact-free sensor element mentioned above, not limited to a magnetic detecting means. That is, as with the second contact-free sensor, the third contact-free sensor element may include those handling electric waves and sonic waves, or electric field and light (including ultraviolet rays and infrared rays).

Of the first contact-free sensor element and the third contact-free sensor element, either one is an element for detecting without making contact, and the other one is an element for generating any signal to be detected without making contact (a generating source).

In the foregoing explanations about the two exemplary embodiments, the display processor 9 is designed to rotate the display direction of the display panel 3 by 180° by receiving the first signal. In the invention, however, the rotating angle of the display direction is not limited to 180° only. Depending on the specification of the personal computer, the rotating angle of the display direction may be set at an angle other than 180°.

In the configuration of exemplary embodiment 2, the magnetic sensor 10, magnetic sensor 12 and magnet 11 can be accommodated in the casing of the main body 1 or display unit 2. Accordingly, since the inside of the casing is isolated from the atmosphere, the personal computer is excellent in protection from water drops and dust. Also by incorporating the components in the inside, nothing projects from the personal computer main body, and hence it is excellent in portability and working efficiency.

Therefore, an appropriate screen can be automatically displayed depending on the mode of use of the personal computer, and moreover when the display panel is closed and the screen is not visible, the power supply to the display panel is cut off, so that unnecessary power consumption can be avoided.

Further, it is possible to detect without making contact, and the tolerance is ample in the mechanical dimensional precision of the contact-free sensor element itself or between such elements, and the shock durability is enhanced and the reliability is improved. Also in this configuration, with the display processor and power saver disposed at the main body side, the wiring is easy between the sensor and display processor. Further, when the magnet is disposed in the middle of the thickness direction of the display unit, the magnetic force at the display panel side and the magnetic force at the back cover side can be easily equalized, so that the reliability of the magnetic sensor can be further enhanced.

In this configuration, since the precision electrical parts composing the personal computer can be enclosed and isolated from the atmosphere, the personal computer is excellent in protection from water drops and dust, and the reliability in outdoor use is enhanced.

As described herein, the information processing apparatus of the invention comprises the personal computer main body, display unit, contact-free sensor, and means operating as a signal source for activating this sensor, and therefore the positional relation of the main body and display unit is known from the signal from the contact-free sensor. Accordingly, the information processing apparatus of the invention changes over the display direction of the display panel or power saving setting of the display unit. The information processing apparatus of the invention incorporates the contact-free sensor and an element operating as a signal source for activating this sensor within a casing. The information processing apparatus of the invention not only automates the changeover of settings, but also improves the protection from water drops and dust and portability of the professional personal computers often used outdoors.

What is claimed is:

1. An information processing apparatus comprising:
    a main body having a first contact-free sensor element;
    a display unit having a second contact-free sensor element;
    a hinge arrangement coupling said main body and said display unit for movement relative to each other;
    wherein said main body has an operation panel;
    wherein said display unit has a display panel and a back panel;
    wherein said hinge arrangement is configured such that said display unit is movable between at least an open position in which said display unit is separated away from said main body, a first closed position in which said display unit is closed over said main body with said display panel of said display unit facing said operation panel of said main body and said back panel of said display unit facing away from said operation panel of said main body, and a second closed position in which said display unit is closed over said main body with said back panel of said display unit facing said operation panel of said main body and said display panel of said display unit facing away from said operation panel of said main body;
    wherein said first contact-free sensor element and said second contact-free sensor element are arranged such that, when said display unit is disposed in one of said first and second closed positions over said main body, said first contact-free sensor element and said second contact-free sensor element face each other so as to output a first signal indicating that said display unit is disposed in said one of said first and second closed positions, and when said display unit is disposed in the other of said first and second closed positions over said main body, said first contact-free sensor element and said second contact-free sensor element do not face each other so as to output a signal indicating that said display unit is disposed in said one of said first and second closed positions; and
    wherein a display processor is provided to receive said first signal indicating that said display unit is disposed in said one of said first and second closed positions and, upon receiving said first signal indicating that said display unit is disposed in said one of said first and second closed positions, to cause rotation of a display of said display panel.

2. The information processing apparatus of claim 1, wherein
    one of said first and second contact-free sensor elements comprises a magnet;
    the other of said first and second contact-free sensor elements comprises a magnetic sensor; and
    said second contact-free sensor element is provided at a free end of said display unit.

3. The information processing apparatus of claim 1, wherein
    one of said main body and said display unit has a third contact-fee sensor element;
    said third contact-free sensor element is arranged such that, when said display unit is disposed in said first closed position over said main body, said third contact-free sensor element faces a paired one of said first and second contact-free sensor elements so as to output a second signal indicating that said display unit is disposed in said first closed position, and when said display unit is disposed in said second closed position over said main body, said third contact-free sensor element does not face said paired one of said first and second contact-free sensor elements so as to output a signal indicating that said display unit is disposed in said first closed position; and
    a power saver is provided to receive said second signal indicating that said display unit is disposed in said first closed position and, upon receiving said second signal indicating that said display unit is disposed in said first closed position, to cause said display unit to go into a power saving mode.

4. The information processing apparatus of claim 3, wherein
    said first contact-free sensor element and said third contact-free sensor element are incorporated in one of said main body and said display unit, and said second contact-free sensor element is incorporated in the other of said main body and said display unit.

5. The information processing apparatus of claim 4, wherein
    said second contact-free sensor element is provided in said other of said main body and said display unit so as to be disposed at a middle portion in a thickness direction of said other of said main body and said display unit.

6. The information processing apparatus of claim 5, wherein
    said second contact-free sensor element is provided in said display unit.

7. The information processing apparatus of claim 1, wherein
    said main body has a third contact-fee sensor element;
    said third contact-free sensor element is arranged such that, when said display unit is disposed in said first closed position over said main body, said third contact-free sensor element faces said second contact-free sensor element so as to output a second signal indicating that said display unit is disposed in said first closed position, and when said display unit is disposed in said second closed position over said main body, said third contact-free sensor element does not face said second contact-free sensor elements so as to output a signal indicating that said display unit is disposed in said first closed position; and a power saver is provided to receive said second signal indicating that said display unit is disposed in said first closed position and, upon receiving said second signal indicating that said display unit is disposed in said first closed position, to cause said display unit to go into a power saving mode.

8. The information processing apparatus of claim 7, wherein said first contact-free sensor element and said third contact-free sensor element comprise magnetic sensors;

said second contact-free sensor element comprises a magnet; and said second contact-free sensor element is provided at a free end of said display unit.

9. The information processing apparatus of claim 7, wherein said first contact-free sensor element and said third contact-free sensor element comprise magnets;

said second contact-free sensor element comprises a magnetic sensor; and said second contact-free sensor element is provided at a free end of said display unit.

10. The information processing apparatus of claim 1, wherein said display unit is configured to serve as an input tablet when disposed in said second closed position.

11. The information processing apparatus of claim 1, wherein said display processor is operable, upon receiving said first signal indicating that said display unit is disposed in said one of said first and second closed positions, to cause rotation of a display of said display panel by 180° degrees.

* * * * *